J. F. MacWILLIAM.
PICKER OPERATING DEVICE.
APPLICATION FILED NOV. 9, 1910.
1,038,166.
Patented Sept. 10, 1912.
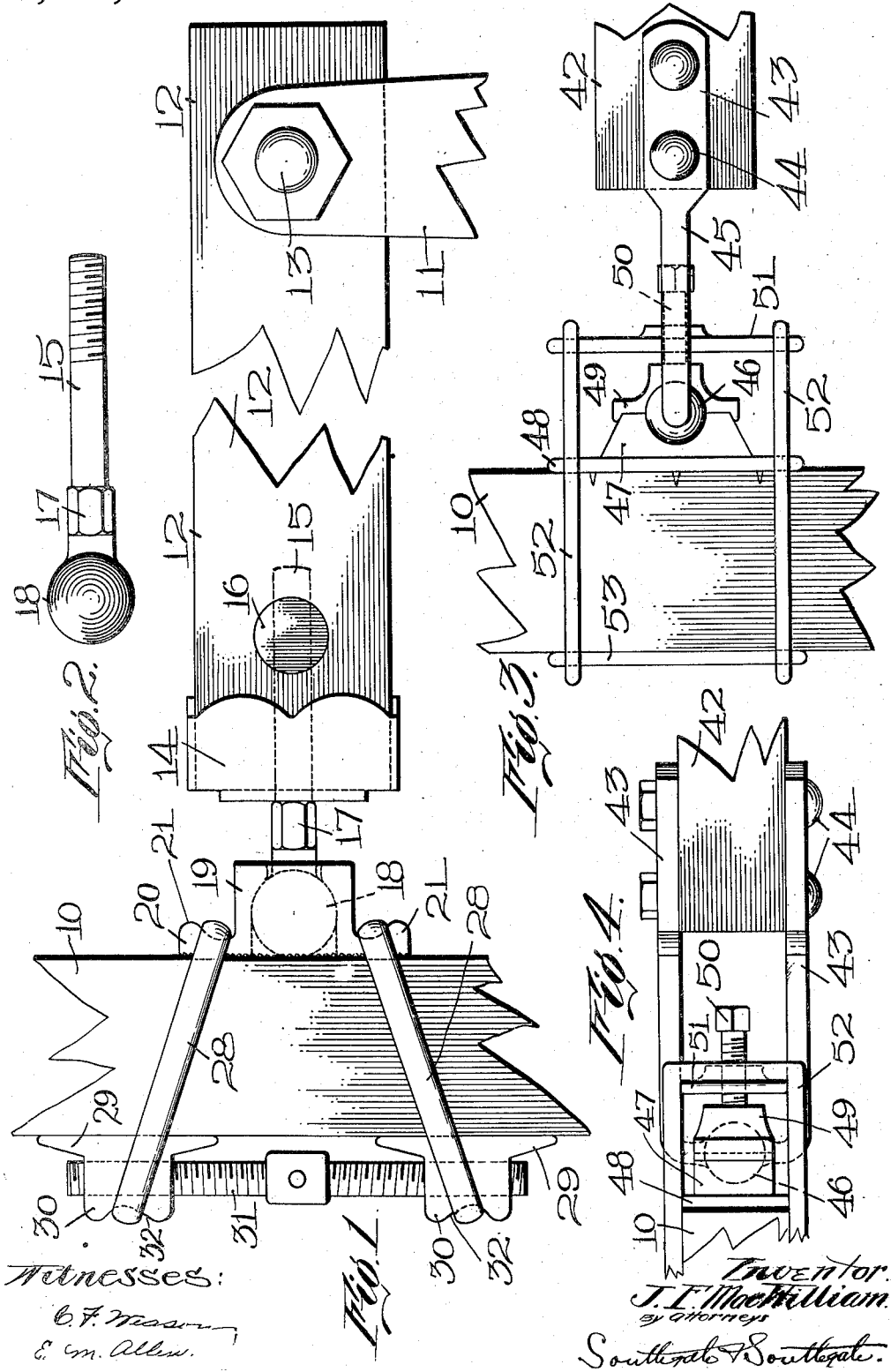

UNITED STATES PATENT OFFICE.

JAMES F. MacWILLIAM, OF HUBBARDSTON, MASSACHUSETTS.

PICKER-OPERATING DEVICE.

1,038,166. Specification of Letters Patent. Patented Sept. 10, 1912.

Application filed November 9, 1910. Serial No. 591,418.

*To all whom it may concern:*

Be it known that I, JAMES F. MacWilliam, a citizen of the United States, residing at Hubbardston, in the county of Worcester and State of Massachusetts, have invented a new and useful Picker-Operating Device, of which the following is a specification.

This invention relates to connections for operating the picker of a loom.

As ordinarily constructed, looms are provided with picker stick straps and power straps which are made chiefly of leather and on a heavy loom will last only a few months. The sweep stick also is generally made of wood and is comparatively short lived. The picker stick sometimes cracks and on account of the holes that have to be bored through it for the attachment of the present connections, is weakened considerably so that the cracks follow from one perforation to another. In this way the present connections in addition to being weak thus also weaken the picker stick.

The principal objects of this invention are to provide a practicable and efficient means of a comparatively simple form for connecting the sweep stick with the picker stick in such a way that there shall be no holes bored through the latter, and in addition thereto to provide a connecting clamp of such form that the picker stick itself shall be strengthened at the points at which the sweep stick connections are applied to it; also to provide a construction which can readily be adjusted up and down the picker stick without disengaging the parts therefrom; also to provide an improved form of universal joint for connecting the sweep stick and picker-stick, and an improved connection between that joint and the sweep stick itself.

Another object of the invention is to provide a construction which can be used with a wooden sweep stick.

Further objects and advantages of the invention will appear hereinafter.

Reference is to be had to the accompanying drawings, in which—

Figure 1 is a side view of a picker-stick and sweep arm and connections between the same in accordance with this invention. Fig. 2 is a detail view of one of the elements thereof. Fig. 3 is a view similar to Fig. 1 showing a modification, and Fig. 4 is a plan thereof.

In the form shown in Figs. 1 and 2, the picker-stick 10 is connected with a rocking operating or sweep arm 11 by means of a wooden sweep stick 12, connected with the sweep arm by a pin or the like 13. This wooden sweep stick is provided with a metallic cap 14 on the end opposite that which is connected with the sweep arm having side and end flanges fitting the end of the sweep stick very closely so as to prevent the splitting thereof. The end of this cap is perforated and through it passes a rod 15. This rod extends lengthwise into the sweep stick and is screw threaded. The screw-threaded end of the rod passes into a nut 16 which is inserted in a hole in the sweep stick. This nut receives the screw-threaded rod 15 and affords a strong and practicable means for holding the rod in the sweep stick. The rod is provided with flat surfaces 17 by which it may be turned up in the nut and has a spherical head 18. This head fits in a spherical socket in a boss 19 on a plate 20. This plate is provided with upper and lower ears 21 depressed at the point at which they are connected with the boss and around these ears extend oval links 28. These links are connected with plates 29 having integral nuts 30 thereon for receiving an adjusting screw 31, thus forming a metallic lug strap. In this case, however, the nuts 30 are provided with saddle like depressed outer surfaces 32 for receiving the rounded ends of the links so that the links bear on the center of each plate 29 thus affording a more efficient construction. In this form of the invention it will be seen that the joint between the metallic lug strap and the wooden picker-stick is of an exceedingly simple construction, that it can be easily adjusted by turning the rod 15, and that the rod is firmly held in position on the sweep stick; also that the latter is well protected against splitting. It will be seen that the two links diverge from each other as they pass across the picker stick from the plate 20. Therefore, the turning of the screw in one direction will force the two plates 29 away from each other and cause the two links to diverge still farther. This causes the plate 20 and the two opposite plates to be gripped firmly on the opposite edges of the picker stick.

It will be noticed that these two plates are smooth on their bearing edges while the plate 20 is roughened or knurled so that once having been set in position, the plate remains fixed. Upon adjusting the two plates outwardly, the whole device is securely clamped to the picker stick and in addition, the latter is effectively secured against cracking, because it is so firmly clamped between the plates at opposite edges. In addition to this, it is clamped in two different directions at an angle to each other and at a material distance apart.

It will be seen that for adjusting the parts up and down it is only necessary to loosen the screw sufficiently to permit the plates to be raised or lowered and that they can be clamped with equal effectiveness in a new position, all without the use of any tools except a spanner or large nail. It will also be seen that there is no lost motion, and that the power strap is dispensed with. The device is made in different sizes and forms to accommodate different looms.

In the form of the invention shown in Figs. 3 and 4, the sweep stick 42 may be of the same construction as the sweep stick 12, but it is shown as having on opposite edges two plates 43 secured to it by bolts 44 passing through it. These plates are connected by integral metallic members 45 integrally with a spherical head 46. This head is located in a spherical socket formed in a boss 47 on a plate 48, and a cap 49 secured thereto in any desired way. In the present instance the plate 48 is held against the picker stick by means of an adjusting screw 50 which engages the cap 49 and holds it firmly in position. This screw passes through a screw threaded passage in a plate 51. This plate is held to the picker stick by a pair of links 52 which connect it with a plate 53 on the other edge of the picker stick. Some of the advantages referred to above are also obtained by this construction.

It is within the scope of this invention to reverse the relative positions of lug strap and picker stick. This can be done very simply in the form shown in Figs. 3 and 4, by transposing the plates 47, 51 and 53 each to the other side of the picker stick. In that case the loop 43 would have to be long enough to extend across the picker stick.

While I have illustrated and described two preferred embodiments of the invention, I am aware that modifications can be made therein by any person skilled in the art without departing from the scope of the invention as expressed in the claims. Therefore I do not wish to be limited to all the details of construction herein shown, but What I do claim is:—

1. The combination of a pair of links for surrounding a picker stick, means for adjustably fixing the links to the picker stick, a sweep stick, and a ball and socket joint for connecting the links with the sweep stick.

2. The combination of a pair of links adapted to surround a picker stick, a screw for adjustably clamping them to the picker stick, a sweep stick, and a ball and socket joint for connecting the links with the sweep stick.

3. As an article of manufacture, a lug strap for a picker-stick comprising a plate adapted to be located on one edge of the picker stick, two plates adapted to be located on the other edge, each having projecting centrally therefrom, a boss having screw threads and constituting a nut, the outer surface of said bosses being depressed, a screw entering said nuts for adjusting said plates toward and from each other, and two links adapted to surround the picker stick and each engaging the depressed portions of said bosses.

4. In a loom, the combination with a picker stick, and a rocking operating arm therefor, of a metallic lug strap fixed on the picker stick, movable means for connecting the metallic lug strap with said arm, means whereby the lug strap can be tightened or loosened and moved along the picker stick, a ball and socket joint connected with the lug strap, and means for adjustably connecting the universal joint with the rocking arm.

5. In a loom, the combination with a picker stick, and a rocking arm for operating it, of a metallic adjustable lug strap fixed on the picker stick, a sweep stick pivoted to the operating arm, a ball and socket on the lug strap at the edge of the picker stick, and means for adjustably connecting said joint and sweep stick.

6. In a loom, the combination with a picker stick and a rocking operating arm therefor, of a lug strap fixed tightly to the picker stick, an operating arm, a sweep stick pivoted at one end to the operating arm, and means for adjustably connecting the lug strap with the other end of the sweep stick.

7. The combination of a pair of links adapted to surround a picker-stick, a screw for tightening said links on the picker-stick, a plate connected with said links and adapted to be clamped thereby against the edge of the picker-stick, said plate having a spherical socket therein, a member having a spherical head fitting in said socket and projecting therefrom, and a sweep arm connected with said means.

8. The combination of a pair of links adapted to surround a picker-stick, a screw for tightening said links on the picker-stick, a plate connected with said links and adapted to be clamped thereby against the edge of the picker-stick, said plate having a spherical socket therein, a member having a spherical head fitting in said socket, said member having a rod projecting therefrom provided with a screw thread, a sweep arm into the end of which the screw threaded rod projects, and a nut extending into the sweep arm at a distance from the end and having a screw-threaded passage for said rod.

9. The combination of a pair of links adapted to surround a picker-stick, a screw for tightening said links on the picker-stick, a plate connected with said links and adapted to be clamped thereby against the edge of the picker stick, said plate having a spherical socket therein, a member having a spherical head fitting in said socket, said member having a rod projecting therefrom provided with a screw thread, a sweep arm into the end of which the screw threaded rod projects, a nut extending into the sweep arm at a distance from the end and having a screw-threaded passage for said rod, and a metallic cap on the end of the sweep arm through which said rod passes for preventing the splitting of the sweep arm.

10. In a loom, the combination with a picker stick and a rocking operating arm therefor, of a lug strap fixed tightly to the picker stick, a sweep stick pivoted on the operating arm, a rod connected with the sweep stick and having a screw-thread, the screw-threaded part of the rod extending into the end of the sweep stick, an adjusting nut on the sweep stick for receiving and holding the rod with respect to the sweep stick, whereby the rod is firmly fixed on the sweep stick, and a pivoted connection at the other end of the rod for connecting it to the lug strap.

11. The combination of a pair of links adapted to surround a picker stick, a screw for tightening said links on the picker stick, a plate connected with said links and adapted to be clamped thereby against the edge of the picker stick, said plate having a spherical socket therein, a member having a spherical head fitting in said socket, an arm projecting from said spherical head, and a sweep arm to which said arm is connected.

12. As an article of manufacture, a lug strap for a picker stick, comprising a plate adapted to be located on one edge of the picker stick, two plates adapted to be located on the other edge, two links connecting the last named plates with the first named plate, and means for adjusting the two plates toward and from each other.

13. In a lug strap for looms, the combination of two links adapted to be located on the picker stick and pivoted at one edge thereof, said links diverging from the points at which they are pivoted across the pickerstick, means for connecting said links at their converging ends, and means for moving the opposite ends of the links toward and from each other.

14. In a lug strap for looms, the combination of two links adapted to be located on the picker stick, pivoted at one edge thereof, and diverging therefrom across the picker stick, means for connecting the converging ends of the links, two plates adapted to receive the other ends of the links, each having a nut thereon, one right-handed and the other left-handed, and a right and left hand screw located between and projecting into said nuts for adjusting them.

15. In a device of the character described, the combination with a picker stick, of a plate located on one edge thereof and having a roughened surface for engaging the picker stick and provided with sockets near its upper and lower edges, links pivoted in said sockets and extending across the picker stick and diverging from each other, a pair of plates located on the opposite edge of the picker stick and projecting under the links, said plates being provided with right and left hand fixed nuts in alinement, and a right and left hand screw engaging said nuts for adjusting the plates back and forth and tightening and loosening the links.

16. In a lug strap for looms, the combination of two links adapted to be located on the picker stick pivoted at one edge thereof and diverging therefrom across the picker stick, means for moving the opposite ends of the links toward and from each other, a plate adapted to be mounted on one edge of the picker stick for receiving the ends of said links, a universal joint connected with said plate, a rocking operating arm, and means for connecting the universal joint with said operating arm.

In testimony whereof I have hereunto set my hand, in the presence of two subscribing witnesses.

JAMES F. MacWILLIAM.

Witnesses:
 ALBERT E. FAY,
 J. ELMER HALL.